United States Patent
Ren et al.

(10) Patent No.: US 7,716,276 B1
(45) Date of Patent: May 11, 2010

(54) NETWORK THAT SUPPORTS USER-INITIATED DEVICE MANAGEMENT

(75) Inventors: Kou Ren, San Diego, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1431 days.

(21) Appl. No.: 10/989,628

(22) Filed: Nov. 16, 2004

Related U.S. Application Data

(60) Provisional application No. 60/523,047, filed on Nov. 17, 2003.

(51) Int. Cl.
 *G06F 15/16* (2006.01)
(52) U.S. Cl. .................. 709/203; 709/226; 455/418; 455/419; 455/466
(58) Field of Classification Search ................ 709/203, 709/226; 455/418, 419, 466
 See application file for complete search history.

(56) References Cited

U.S. PATENT DOCUMENTS

| | | | | |
|---|---|---|---|---|
| 5,261,055 | A | 11/1993 | Moran et al. ............... | 395/275 |
| 5,442,771 | A | 8/1995 | Filepp et al. ............... | 395/650 |
| 5,479,637 | A | 12/1995 | Lisimaque et al. .......... | 395/430 |
| 5,579,522 | A | 11/1996 | Christeson et al. ......... | 395/652 |
| 5,596,738 | A | 1/1997 | Pope .......................... | 395/430 |
| 5,598,534 | A | 1/1997 | Haas ...................... | 395/200.09 |
| 5,608,910 | A | 3/1997 | Shimakura .................. | 395/670 |
| 5,623,604 | A | 4/1997 | Russell et al. ............ | 395/200.1 |
| 5,666,293 | A | 9/1997 | Metz et al. ............... | 395/200.5 |
| 5,752,039 | A | 5/1998 | Tanimura ................... | 395/712 |
| 5,778,440 | A | 7/1998 | Yiu et al. ................... | 711/154 |
| 5,790,974 | A | 8/1998 | Tognazzini ................. | 701/204 |
| 5,878,256 | A | 3/1999 | Bealkowski et al. ........ | 395/652 |
| 5,960,445 | A | 9/1999 | Tamori et al. ............... | 707/203 |
| 6,009,497 | A | 12/1999 | Wells et al. ................. | 711/103 |
| 6,038,636 | A | 3/2000 | Brown, III et al. .......... | 711/103 |
| 6,064,814 | A | 5/2000 | Capriles et al. ............. | 395/701 |
| 6,073,206 | A | 6/2000 | Piwonka et al. ............. | 711/102 |
| 6,073,214 | A | 6/2000 | Fawcett ...................... | 711/133 |
| 6,088,759 | A | 7/2000 | Hasbun et al. .............. | 711/103 |
| 6,105,063 | A | 8/2000 | Hayes, Jr. ................... | 709/223 |

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Jinsong Hu

(57) ABSTRACT

A network supporting user-initiated management of updatable mobile electronic devices such as, for example, cellular phones, personal digital assistants, pagers, personal computers, and the like, permits a user to employ a personal computer (PC) or other device to browse information web portal in order to determine whether an update of firmware, software, and/or configuration information in the mobile electronic device is appropriate. If the user determines that an update is appropriate, or if a content server or a device management (DM) server determines that an update is appropriate, the user may schedule a download of one or more update packages. The update packages may comprise executable instructions for converting a first firmware/software version to a second firmware/software version, and may have associated multi-purpose internet mail extension (mime) types. An update may be immediately executed, or an update may be scheduled and performed at a later time according to the user-selected schedule.

8 Claims, 3 Drawing Sheets

U.S. PATENT DOCUMENTS

| | | | |
|---|---|---|---|
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,308,061 B1* | 10/2001 | Criss et al. | 455/418 |
| 6,311,322 B1 | 10/2001 | Ikeda et al. | 717/1 |
| 6,438,585 B2 | 8/2002 | Mousseau et al. | 709/206 |
| 6,615,038 B1* | 9/2003 | Moles et al. | 455/418 |
| 6,959,436 B2* | 10/2005 | Peng | 719/310 |
| 7,020,468 B2* | 3/2006 | Squibbs et al. | 455/445 |
| 2001/0029178 A1* | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0123359 A1* | 9/2002 | Wei et al. | 455/466 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2006/0100928 A1* | 5/2006 | Walczak et al. | 705/14 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

NETWORK THAT SUPPORTS USER-INITIATED DEVICE MANAGEMENT

RELATED APPLICATIONS

The present application makes reference to, claims priority to, and claims benefit of U.S. Provisional Patent Application Ser. No. 60/523,047 entitled "Network That Supports User-Initiated Device Management", filed Nov. 17, 2003, the complete subject matter of which is hereby incorporated herein by reference, in its entirety.

The present application makes reference to PCT Application with publication number WO/02/41147 A1, PCT number PCT/US01/44034, entitled "System and Method for Updating and Distributing Information", filed 19 Nov. 2001, the complete subject matter of which is hereby incorporated herein by reference, in its entirety.

The present application also makes reference to U.S. Provisional Patent Application Ser. No. 60/249,606 entitled "System and Method for Updating and Distributing Information", filed Nov. 17, 2000, the complete subject matter of which is hereby incorporated herein by reference, in its entirety.

The present application also makes reference to U.S. Provisional Patent Application Ser. No. 60/479,268 entitled "Management Tree Management in Mobile Handset" filed Jun. 18, 2003, the complete subject matter of which is hereby incorporated herein by reference, in its entirety.

The present application also makes reference to U.S. patent application Ser. No. 10/698,665 entitled "Open Update Framework for Mobile Handsets Capable of Processing Firmware and Software Update Packages Based on Mime Types", filed on Oct. 30, 2003, the complete subject matter of which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain errors or bugs. New versions of the firmware and/or software are periodically released to fix the bugs or to introduce new features, or both.

A generator in a manufacturing environment of an electronic device such as a mobile handset, or in other software development environments, generates update packages that are used to update the firmware and/or software components. These update packages are typically deposited into a repository. Unfortunately, several different generators may be generating different kinds of information. There is no easy way to populate these different kinds of update packages into a repository. More importantly, a repository within a distribution environment that can disseminate these update packages may need to accommodate the different formats in which the update packages are made available. In addition, other related information, such as metadata, often associated with update packages may be used for making decisions on dissemination of update packages. Such related information is often unavailable, however, to the distribution environments. Special software is often written to retrieve such related information from remote sources when necessary.

Users of mobile electronic devices who experience problems with their devices have no easy way to determine what is wrong, or how to initiate a quick fix. They typically take the mobile device back to a store or service center to have any associated problems diagnosed and fixed.

Mobile electronic devices are often cumbersome to operate, especially with the small keypads and keyboards with which they are equipped. Because of this, searching and retrieving information using a mobile electronic device is often a frustrating experience.

Currently, wireless handset and handheld device users must go to specific Internet portals provided by a carrier or manufacturer to view, select, and download device content such as, for example, pictures, melodies, and games to a personal computer (PC). The user must then use a custom software tool to load and synchronize the content into the device via a cable or short-range-wireless media such as Bluetooth or IrDA. All of this takes technical skills and knowledge, and is often a very daunting task to cell phone users.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a device management network that facilitates user initiation of a device management task. Such a device management network may comprise at least one mobile electronic device, and a web portal enabling selection of a device management task by a user using a web browser. The web portal may facilitate the user in the specification of a schedule for the device management task, and the device management network may perform the device management task in accordance with the schedule. A representative embodiment of the present invention may also comprise at least one device management server capable of performing the device management task on the at least one mobile electronic device. The at least one mobile electronic device may be capable of receiving a notification from the device management task, of executing at least a portion of the device management task, and of notifying the at least one device management server after it has completed the at least a portion of the device management task.

In various representative embodiments of the present invention, the device management task may comprise at least one of a firmware update task, a software update task, a configuration update task, a user account setup task and a device provisioning task. The at least one mobile electronic device may be capable of facilitating browsing of the web portal and selection of the device management task. The at least one mobile electronic device may comprise one of a cellular phone, a pager, a personal digital assistant (PDA), and a personal computer. The device management network may comprise a communication device communicatively coupled to the web portal. The communication device may be capable of browsing the web portal, and the web portal may be capable of accepting, via the communication device, user selections of device management tasks for managing the at least one mobile electronic device. In a representative embodiment of the present invention, the communication device may comprise a personal computer (PC). The web portal may authenticate the user before initiating execution of a device management task on the at least one mobile electronic device. In a representative embodiment of the present invention, a device management server may authenticate the at least one mobile electronic device and the at least one mobile electronic device may authenticate the device management server before executing a user-selected device management task.

Further aspects of the present invention may be found in a wireless network with a self-care service facilitating subscriber access to a plurality of device management services. A wireless network in accordance with a representative embodiment of the present invention may comprise a self-care portal that facilitates selection by a subscriber of at least one of the plurality of device management services, and a mobile electronic device associated with the subscriber. The wireless network may also comprise a device management server communicatively coupled to the self-care portal and the mobile electronic device. The device management server may facilitate device management of the mobile electronic device in response to selection of device management services by the subscriber at the self-care portal. The plurality of device management services may comprise at least one of a bootstrap provisioning service, a configuration service, a firmware update service, a software update service, and a content download service.

In a representative embodiment of the present invention, the subscriber may employ a personal computer (PC) to browse the contents of the self-care portal, and the self-care portal may facilitate determining whether at least one of the plurality of device management services is appropriate for the mobile electronic device. The self-care portal may instruct the device management server to facilitate performing the at least one of the plurality of device management services. The subscriber may select a schedule for the delivery of the at least one of the plurality of device management services. In a representative embodiment of the present invention, the schedule may be for immediate delivery of the at least one of the plurality of device management services. In another representative embodiment of the present invention, the schedule may be for a future delivery of the at least one of the plurality of device management services. The device management server may defer delivery of the at least one of the plurality of device management services as per the schedule. The subscriber may select a different schedule for the delivery of each of the at least one of the plurality of device management services. In a representative embodiment of the present invention, the subscriber may receive a notification for each of the at least one of the plurality of device management services that have been scheduled, after they have been delivered. In a representative embodiment of the present invention, the subscriber may receive notification on the mobile electronic device soliciting approval for delivery of each of the at least one of the plurality of device management services that have been scheduled.

In a representative embodiment of the present invention, the subscriber may select a device management service that results in the transfer of an update package of an appropriate multipurpose internet mail extension (mime) type to the mobile electronic device. The multipurpose internet mail extension (mime) type may also be communicated to the device. The update package may comprise a set of executable instructions for converting a first code version to a second code version, in the mobile electronic device. The mobile electronic device may process the update package based upon a multipurpose internet mail extension (mime) type that is communicated to the device as part of an update package metadata. A billing trigger may be generated after each of the at least one of the plurality of device management services has been delivered. Such a billing trigger may result in the subscriber being billed and in the subscriber receiving a billing notification on at least one of the web portal and the mobile electronic device. In various representative embodiments of the present invention, the mobile electronic device may comprise one of a cellular phone, a pager, a personal digital assistant (PDA), and a personal computer.

These and other advantages, aspects, and novel features of the present invention, as well as details of illustrated embodiments, thereof, will be more fully understood from the following description and drawings.

DETAILED DESCRIPTION OF THE INVENTION

The present invention relates generally to the device management of mobile electronic devices, and more specifically, to the user-initiated device management activities that result in the dissemination of update packages to the mobile electronic device to update firmware, software or configuration information. Although the following discusses aspects of the present invention in terms of a mobile handset, it should be clear that the following also applies to other mobile electronic devices such as, for example, personal digital assistants (PDAs), pagers, personal computers (PCs), and similar handheld electronic devices.

Figure 1:
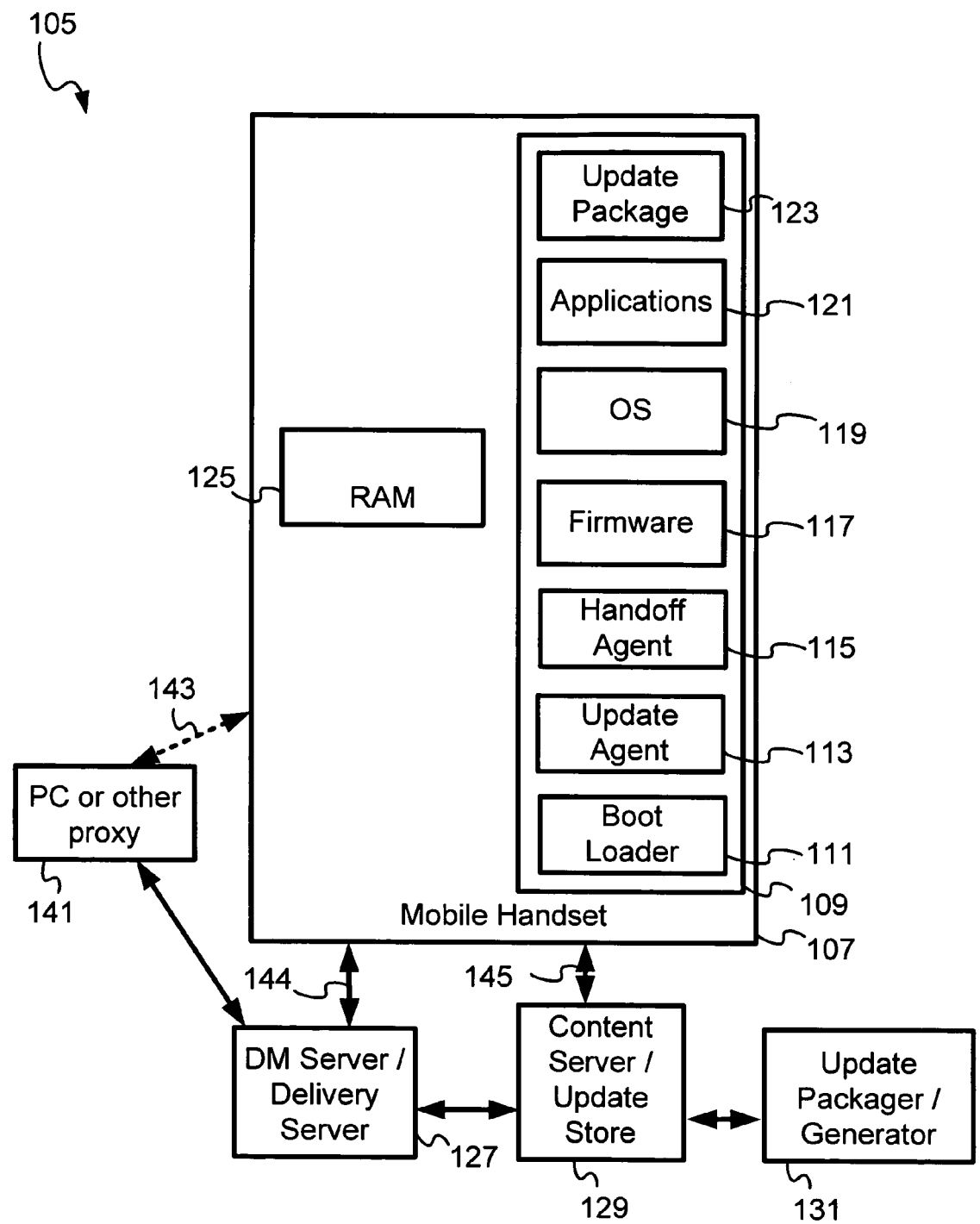
FIG. 1 is a perspective diagram of an exemplary network such as, for example, a carrier network that supports user-initiated download of update packages or user-initiated device management activities, in accordance with a representative embodiment of the present invention.

FIG. 1 is a perspective diagram of an exemplary network 105 such as, for example, a carrier network that supports user-initiated download of update packages or user-initiated device management activities, in accordance with a representative embodiment of the present invention. As shown in FIG. 1, the network 105 comprises a mobile handset 107 that may download update packages employing over-the-air (OTA) or other techniques, and may update its firmware 117 and software 119, 121. The network 105 also comprises an optional update packager/generator 131 that may generate update packages for transfer to a content server/update store 129 and/or a device management (DM) server/delivery server 127. In a representative embodiment of the present invention, an update package may comprise a set of executable instructions for converting a first version of code into a second version of code in the mobile electronic device. The update package may have an associated multipurpose interne mail extension (mime) type, and may comprise metadata. The mobile handset 107 may be communicatively coupled to the DM server/delivery server 127 and/or the content server/update store 129 using, for example, communications links 144, 145, respectively, that may comprise wireless communication networks such as, for example, a cellular network, a personal communications service (PCS) network, a paging network, and a wireless local area or personal area network.

In addition to the elements described above, the mobile handset 107 of FIG. 1 comprises non-volatile memory 109 and random access memory 125. The non-volatile memory 109 shown in FIG. 1 comprises an update package 123, applications 121, an operating system (OS) 119, firmware 117, a handoff agent 115, an update agent 113, and a boot loader 111. Although the illustration of FIG. 1 shows a particular arrangement or assortment of elements, this does not represent a limitation of the present invention. A greater number or different assortment of the elements described above may be present without departing from the spirit and scope of the present invention.

In the network 105 of FIG. 1, a personal computer (PC) or other proxy device 141 may communicate with the mobile handset 107 to determine device information (e.g., make, model, version of hardware and/or software, configuration parameters, etc.) using a communication link 143 that may comprise a wired or wireless communication network including, for example, a public switched telephone network (PSTN), a cellular network, and a wireless local area or personal area network. Such communication may happen silently, without user awareness, whenever the mobile handset 107 comes into proximity with the PC or other proxy device 141. Alternatively, such communication may occur whenever the user initiates it either from the PC or other proxy device 141 or from the mobile handset 107.

In a representative embodiment of the present invention, the user may employ, for example, the PC or other proxy device 141 (or a set-top-box in her proximity) to browse the content-server/update store 129 and determine whether an update of the mobile handset 107 is appropriate. If an update of firmware, software and/or configuration information in the mobile handset 107 is determined to be appropriate by the user (or if the content server/update store 129 determines it to be appropriate), then the user may schedule a download of one or more update packages. In one representative embodiment of the present invention, the download may be immediately executed and scheduling may not involved. In another representative embodiment of the present invention, scheduling may be included, and the user may be allowed to schedule a download, the download being deferred as per the schedule.

In a representative embodiment of the present invention, a user may employ, for example, the PC or other proxy device 141 (or a set-top-box in her proximity) to browse the DM server/delivery server 127 and to determine whether an update is appropriate.

In one representative embodiment in accordance with the present invention, the user may select one or more software updates and/or applications to be installed into the mobile handset 107 using, for example, the mobile device 107. The mobile handset may communicate with, for example, the PC or other proxy device 141, the DM server/delivery server 127, and/or the content server/update store 129.

In a representative embodiment of the present invention, update packages generated by the update packager/generator 131 may be associated with appropriate multipurpose interne mail extension (mime) types and may be transferred to the content server/update store 129 employing an update package container (UPC) format. User-initiated download of update packages to a mobile handset such as, for example, mobile handset 107 may be delivered using an OTA link via the content server/update store 129, using an OTA link via the DM server/update store 127, or using a wireless local area network (LAN) or other wireless data transfer means via the PC or other proxy device 143, for example.

In a representative embodiment of the present invention, a mobile device such as, for example, the mobile handset 107 may have a management tree that supports special managed objects (also referred to as special nodes) that are placed in "well-known" or pre-determined address locations of memory such as, for example, non-volatile memory 109. Update packages such as, for example, the update package 123 may be downloaded from a DM server such as, for example, the DM server/delivery server 127 of FIG. 1 following user-initiated DM activity. The user may initiate the activity via a mobile device such as, for example, the mobile handset 107, or from a proxy device such as, for example, the PC or other proxy device 141. The downloaded update packages may be placed in appropriate special nodes based upon the mime-type of the update packages or based on other characteristics. A download agent (or browser) that downloads such update packages may place the update package 123 in such special nodes. Alternatively, an update package, or only related metadata, may be placed in a special node by a handoff-agent such as, for example, the handoff agent 115. Such special nodes may be accessible by an update agent that processes the update package 123 such as, for example, the update agent 113 of FIG. 1.

In a representative embodiment of the present invention, the user initiated activity may result in a device management activity that transfers an update package such as, for example, the update package 123 having an appropriate associated mime type to a mobile handset such as, for example, the mobile handset 107. The mobile handset 107 may process the update package 123 based on an associated mime type that is communicated to the mobile handset 107 as, for example, part of the update package 123, as information associated with the transport of the update package 123, etc. Thus, a mime type that is associated with an update package by, for example, a manufacturer or other source of code or update packages, may be processed by the mobile handset 107 to determine not only a special node(s), but also to determine one of several available clients as the appropriate client to process the update package(s).

In a representative embodiment of the present invention, an update packager/generator such as, for example, the update packager/generator 131 may create one or more update packages such as, for example, the update package 123, determine metadata, and associate an appropriate mime type with the update package 123. The update packager/generator 131 may also determine or compute security information such as, for example, digital signatures, and may incorporate the security information into an update package container/catalog (not shown). The update package container/catalog may be communicated to a content server/update store such as, for example, the content server/update store 129 that serves as a repository for the network 105 of FIG. 1. The content server/update store 129 may be capable of parsing the update package container/catalog, and selectively retrieving all or a subset of the available update packages 123. The content server/update store 129 may also be capable of selectively verifying the authenticity of an update package container/catalog as well as that of the update packages contained within, and of saving information in a storage and behaving as a repository of update packages and associated metadata.

In accordance with a representative embodiment of the present invention, update packages from one or more manufacturers with update packager/generators such as, for example, the update packager/generator 131 may be sent to a content server/update store such as, for example, the content server/update store 129 for storage and subsequent dissemination to the mobile handsets 107 via the DM server/delivery server 127.

In a representative embodiment of the present invention, when a user employs, for example, a PC or other proxy device 141 to select firmware and/or one or more software downloads from, for example, the content server/update store 129, or from a portal which has access to the content server/update store 129, the selected firmware and/or one or more software downloads may be scheduled for immediate delivery/download to the mobile handset 107. Such scheduling may be accomplished with the help of separate scheduling or promotion management components, or with the help of the DM server 127, for example. The DM server/delivery server 127 may then optionally send a notification to the mobile handset 107 regarding the download, and may send the selected firmware and/or one or more software downloads as one update package to the mobile handset 107. The DM server/delivery server 127 may retrieve status information indicating success or failure of such updates after the update in the mobile handset 107 is completed. In another representative embodiment of the present invention, the DM server/delivery server 127 may send the selected firmware and/or one or more software downloads as one or more individual update packages to the mobile handset 107. In yet another representative embodiment of the present invention, the DM server/delivery server 127 may not send a notification to the mobile handset 107 regarding the download. Instead, the DM server/delivery server may initiate a silent (e.g., without any additional user interaction) download of the update package(s) and their subsequent consumption in an update process.

In a representative embodiment of the present invention, when a user employs a device such as the PC or other proxy device 141, for example, to select firmware and/or one or more software downloads from a content server/update store such as the content server/update store 129, or from a portal which has access to the content server/update store 129, the selected firmware and/or one or more software downloads may be scheduled for deferred delivery/download to a mobile handset such as, for example, the mobile handset 107. Such scheduling may be accomplished with the help of a separate scheduling or promotion management components, or with the help of the DM server/delivery server 127. The DM server/delivery server 127 may then send a notification to the mobile handset 107 regarding the download at the as per the schedule, and may send the selected firmware and/or one or more software downloads as one update package to the mobile handset 107. After the update in the mobile handset 107 is completed, the DM server/delivery server 127 may retrieve status information indicating success or failure of such updates. In a representative embodiment of the present invention, the user may also schedule the update (e.g., at the same or a different time) while scheduling the download at the content server/update store 129, or from a portal.

In a representative embodiment of the present invention, a user may be prompted to approve conditional billing while scheduling a download of one or more software and/or firmware updates. Such conditional billing may be initiated following the successful download and confirmed update of a device such as, for example, the mobile handset 107. In a representative embodiment of the present invention, the billing may be initiated immediately following the successful download of one or more software and/or firmware updates.

In a representative embodiment of the present invention, a user may select software and/or firmware for download using, for example, a PC or other proxy device 141, and may, for example, schedule a deferred download. The user may be prompted to approve billing before any download is scheduled. In another representative embodiment of the present invention, the user may be allowed to schedule a download after selecting one or more software and/or firmware updates, but may then be prompted to approve billing before the download is initiated. In such a representative embodiment, the download may be initiated only after the user has approved a billing in a deferred mode or in an immediate mode as per user preference.

In a representative embodiment of the present invention, a user may select software and/or firmware for download using a device such as, for example, the PC or other proxy device 141 of FIG. 1, and may schedule a deferred download. In addition, the user may schedule the delivery of security information or the acquisition of one or more rights objects. In one representative embodiment of the present invention, the delivery of one or more rights objects to a device such as, for example, the mobile handset 107 may be automatically initiated by a delivery server/update store such as, for example, the delivery server/update store 127 after the user has successfully scheduled the download of update packages for firmware and/or software updates. In another representative embodiment in accordance with the present invention, the delivery of one or more rights objects to the mobile handset 107 may be automatically initiated by the delivery server/update store 127 after the user has successfully scheduled the download of update packages for firmware or software updates.

A representative embodiment of the present invention provides the user the advantage of initiating actions as desired, experiencing and trying out the content before the download. In addition, the user benefits from the rich information presentation capabilities provided by the Internet and a desktop browser that may be used to navigate the carrier portal web pages easily and in a well-informed way. For example, a user may be able to see the graphical content, listen to the melodies or tones, see a demo of games as well as read any detailed help information provided online. The user may then decide which downloads they wish to access, select the downloads, and download the selected software/firmware.

With the advance of mobile handset/handheld devices towards 2.5G and 3G standards, many new handset software features and protocols are coming into the market as the result of increased wireless bandwidth, increased wireless device and network capabilities, more advanced wireless data services, and wireless multimedia services. Standards such as the Open Mobile Alliance (OMA) download standards, and SyncML Data Synchronization and Device Management standards are enabling many new ways of performing OTA mobile electronic device content download, data synchronization, and device management.

A representative embodiment of the present invention supports various ways of performing content download, data synchronization, and device management. A first representative embodiment of the present invention may effectively move the wired-Internet portal into the handset. This may be achieved by using built-in software in a mobile handset such as, for example, a micro browser to allow the user to initiate transactions such as, for example, the downloading of content (e.g., pictures, melodies, games). A user may browse to a wireless-content-enabled (e.g., using wireless application protocol (WAP)) website and may click on icons representing the content, to download, synchronize, or to install directly and immediately over the air. A user may also perform device management by selecting device management tasks from a menu (e.g., reconfigure the browser settings, GPRS settings, etc.) Device management tasks, for example, may be either installed as pre-loaded tasks or dynamically negotiated and downloaded from a device management server to the wireless mobile handset.

In another representative embodiment of the present invention. The network may have the capability to initiate the tasks of content download, data synchronization and device management through a bootstrapping mechanism such as, for example, short message service (SMS) alert or WAP-push. The mobile handset user may then be alerted about the tasks and asked for permission to execute the tasks. In some representative embodiments in accordance with the present invention, the user may perceive that a combination of the two approaches described above are used in the implementation.

In a representative embodiment of the present invention, a user may directly and immediately download content using OTA techniques, and may manage the mobile electronic device using OTA techniques. This saves the user time when compared with a conventional approach of downloading content to a local machine and performing an actual download to the mobile handset as a second step. In addition, use of a representative embodiment of the present invention saves a customer from the direct investment of purchasing the tools used to download the content such as, for example, a cable and additional custom download/synchronization software. Wireless carriers also benefit from increased revenue and may capitalize on the services provided since the download, device management (DM), and data synchronization (DS) traffic increases the amount of data transferred over the carrier network.

A wireless (i.e., mobile) handset may have very limited real estate in terms of screen size, content display capabilities, and memory size. Users may find it extremely difficult to determine that the software/firmware they download is what they really want. Because the user is unable to try out the content before downloading the content such as, for example, by playing a sample of multimedia content pictures, melodies, videos, and software games, then the network resources and money spent for the download, and personal time, may be wasted as a result of an incorrect download choice. The amount of information about the variety of content available for download may be restricted by the handset's display and memory limitation since the amount of information available on the network may be significantly larger than the amount that may be retrieved and supported by the limited display and memory capabilities of a wireless device at any give time.

In a representative embodiment of the present invention, a communication network (e.g., wireless carrier, enterprise IT department) may be involved in the download, DS, and DM tasks. The network may better utilize the network's expertise in the task performed. The network side may initiate the service.

A representative embodiment of the present invention defines a new method of performing handset content download, data synchronization and device management by leveraging existing technologies such as over the air download and provisioning, Sync ML, wired-Internet and wireless networks.

Figure 2:
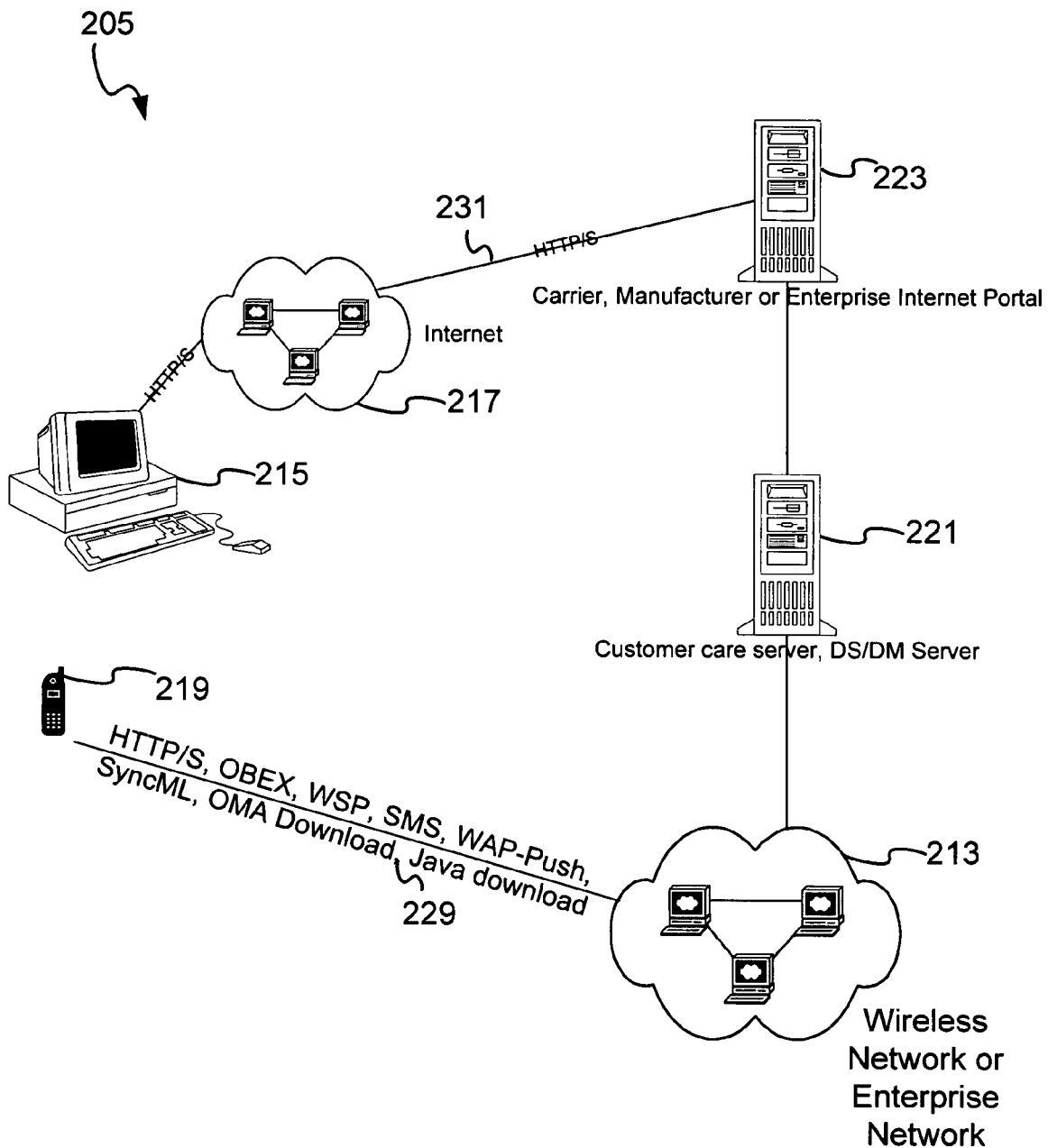
FIG. 2 is a perspective block diagram of an exemplary management network comprising mobile devices, the management network supporting user-initiated device management in accordance with a representative embodiment of the present invention.

FIG. 2 is a perspective block diagram of an exemplary management network 205 comprising mobile devices 219, the management network 205 supporting user-initiated device management in accordance with a representative embodiment of the present invention. As shown in FIG. 2, the management network 205 comprises a mobile device 219; a personal computer (PC) 215 of a user; an Internet network 217 that may, for example, represent a variety of networks; an Internet portal 223; a data synchronization (DS)/device management (DM) server 221; and a wireless network 213. The wireless network 213 may be, for example, a cellular or personal communications services (PCS) network, or a wireless local area or personal area network. A representative embodiment in accordance with the present invention enables a user of a wireless handset to initiate content download, data synchronization, and device management over the air in the wireless network 213 from a desktop web browser on a PC 215 connected to the wired-Internet network 217.

In a representative embodiment of the present invention, a service provider or manufacturer, for example, may publish the download, data synchronization, and device management content/tasks through a network portal such as, for example, the Internet portal 223 of FIG. 2. As shown in FIG. 2, the Internet portal 223 is connected to other network service components such as the DS/DM server 221 that may, for example, comprise a device synchronization server, and wireless network 213 to enable delivery, over-the-air, of user-selected content and tasks to the mobile device 219 (a/k/a, handset 219, mobile handset 219).

In a representative embodiment of the present invention, a wireless service provider such as, for example, the operator of wireless network 213, or a manufacturer of mobile handsets such as the mobile handset 219, may provide a network portal such as, for example, the Internet portal 223, for handset customer care service that may be accessible from the Internet portal 223. The customer care service may include themes such as, for example, handset downloadable content, data synchronization, and device management. The Internet portal 223 may be connected and integrated with other network component such as DS/DM server 221, customer databases (not shown), and wireless network 213 for over the air delivery of the customer care service to customer mobile handsets 219.

In a representative embodiment of the present invention, a user may use a desktop Internet browser on PC such as, for example, the PC 215 to connect to the network portal of a service provider or manufacturer, and to perform tasks such as handset content download, data synchronization, and device management in a self-service fashion. Depending upon how the user has defined the schedule of the selected tasks, the user may turn on the wireless (i.e., mobile) handset 219 at the scheduled time. For example, if a user chooses to carry out the tasks immediately after performing the selection online, the user may keep the handset to be serviced on, to allow the handset to be serviced over the air.

In a representative embodiment of the present invention, a service provider or handset manufacturer may provide comprehensive support on a network portal such as, for example, the Internet portal 223 for handset customer care services. The supported services may include self-services for over-the-air handset content download, data synchronization, and device management. In a representative embodiment of the present invention, the provided self-services may include the following characteristics:

A representative embodiment of the present invention may focus on a customer-oriented business process to provide a comprehensive suite of online representation and business logic flow for handset content download, data synchronization and device management. The business logic provided by the a network portal such as, for example, the Internet portal 223 may take into consideration the inter-operation with other network services such as the DS/DM server 221 and the wireless network 213. Additional flexible business logic may be provided to facilitate the entire process. A representative embodiment of the present invention may providing time scheduling capability that may be applied to the overall selected tasks or an individual task. A representative embodiment of the present invention may support offering a user the capability to approve conditional billing or approve subsequent billing after successful download, and may offer a user the capability to choose a quality of service associated with selected tasks. A representative embodiment in accordance with the present invention may support offer the capability of scheduling delivery of rights objects (RO), such as a DRM rights object, or a license, as in the case of super distribution. Calculation of the time involved, or optionally, an estimate of call charges in acquiring software or firmware, based on the download data size may be supported. A representative embodiment of the present invention may permit associating time involved, call charges, and other related information with the corresponding tasks to be initiated, in order to provide a user a service or content that the user has initiated. A representative embodiment of the present invention may also provide data validation for each user request, based on authentication and authorization data available from a customer database at the portal, and/or by employing an interface with other network service nodes. In addition, a representative embodiment of the present invention may place an emphasis on ease of use, by leveraging the rich Internet publication and desktop browser display capability and providing intuitive data representation, navigation, search and help information. A representative embodiment of the present invention may support the scalability of portal services and ease of integration with other network application that may be achieved. In addition, a representative embodiment of the present invention may permit more personalized service to be offered based on the knowledge base of the backend customer database.

A representative embodiment of the present invention provides a well-defined security model to facilitate identity management and single sign-on services. These services ensure that user tasks selected in a self-service manner on a network portal such as, for example, the Internet portal 223, and subsequent over the air (OTA) activities are consistent and secure. Additional security mechanisms such as certificate-based security may be used to allow the mobile handset 219 to have a certificate provisioned in order to enable a service selected by a user (e.g., a game or new software service such as push-to-talk is downloaded).

In a representative embodiment of the present invention, the user of a mobile handset may log onto a network portal such as, for example, the Internet portal 223 of a service provider or a mobile handset manufacturer in order to select desired content, DS tasks, and DM tasks. For example, after the user has selected the desired tasks and passed security checks, the user may be asked to turn on his/her mobile handset 219, if it is not already on. The user may be informed of an estimated time for completion of the tasks. Then the user may be able to perform the selected tasks online. An optional billing trigger may also be selectively generated.

In a representative embodiment of the present invention, a network portal such as, for example, the Internet portal 223 may choose to validate a user request and pass on the validated request for a second phase of processing. The second phase of processing may involve a DM, DS, or/and customer care server such as, for example, the DS/DM server 221 in order to perform the actual execution of the user-selected tasks. Such user-selected tasks may involve transformation of the user-selected tasks into a format suitable for SyncML or OMA download, if the associated data has not been transformed at the network portal or at some other intermediate point. For example, the process may include alerting a mobile handset such as, for example, the mobile handset 219 through short message service (SMS), wireless application protocol (WAP)-push, as well as interaction between the mobile handset and the network according to Open Mobile Alliance (OMA) download, SyncML, or other protocols. In a representative embodiment of the present invention, the user-selected tasks are carried out through the use of a protocol appropriate for the task.

In a representative embodiment of the present invention, a step of the process may involve the sending of result data and/or status information back to a wireless network such as, for example, the wireless network side 213 by a mobile handset such as, for example, the mobile handset 219. The wireless network 213 may pass the received result data and status information to a browser on the PC of a user such as, for example, the PC 215 of FIG. 2, in order to notify the user of the results following task completion, or the establishment of a completion status.

A representative embodiment of the present invention provides a number of benefits to the user of a mobile handset such as, for example, the mobile handset 219 of FIG. 2. A representative embodiment in accordance with the present invention provides a centralized location (e.g., a website) in which to look for what they want, and to perform what they want. A representative embodiment of the present invention saves unnecessary user action, reduces frustration of downloading uncertain content that may be discarded later, and helps a user to avoid charges for the unnecessary data transmission. A representative embodiment of the present invention provides a user-friendly method of allowing a user to take charge of what tasks are done, and when they are done. A representative embodiment of the present invention provides a user a wider range of selection and control in terms of choice of download content, device synchronization (DS)/device management (DM) tasks, and choice of level of services. In addition, a representative embodiment in accordance with the present invention helps a user to find their preferred localized information and to perform tasks corresponding to their preferred localized information. A representative embodiment of the present invention allows a user to employ a familiar desktop browser to perform download and DS/DM tasks in a more friendly manner. For example, a representative embodiment of the present invention provides more description on a network portal (i.e., website) related to any of the tasks available, allows a user to try out the content before performing a download, and helps a user to minimize or avoid the difficult learning curve involved with using a presentation-limited mobile handset to perform infrequently performed tasks such as, for example, content download and DS/DM tasks.

A representative embodiment of the present invention provides a number of benefits to the operator of a wireless carrier network, to associated enterprise IT management, and to service providers in general. For example, a representative embodiment in accordance with the present invention provides for more efficient customer request processing, and saves service provider resources such as, for example, the human resources involved in supporting and managing customer care service. A representative embodiment of the present invention allows service providers to provide easy central and unified management of customer care service content, and allows service providers to provide localized and internationalized service easily at a central location. In addition, a representative embodiment of the present invention allows service providers to deploy certain new services easily, and allows service providers to provide many value added services automatically at the web tier such as throttling, service scalability, and quality of service. A representative embodiment in accordance with the present invention also saves wireless network bandwidth in service provider networks.

A representative embodiment of the present invention allows users to customize their handset and allows operators of carrier networks to provide efficient customer care for problems related to mobile handsets such as, for example, the mobile handset 219 of FIG. 2. A manufacturer of mobile handsets or an operator of a wireless carrier network, for example, may use a representative embodiment in accordance with the present invention to provide a customer care portal on the wired-Internet. Using a representative embodiment of the present invention, a user may avoid the need to download content to a local machine and then use custom software to load the data into the handset through a costly cable or short range radio such as Bluetooth. Instead, a representative embodiment of the present invention allows the user to use the handset to browse to the customer wireless portal to perform the desired action, or the operator to push-initiate DS/DM actions to the customer mobile handset. A portal in accordance with a representative embodiment of the present invention provides a user with a wide range of choices, clearer descriptions of what is available or provided, instant user feedback, localization support, and give the user the preference of selecting what is to be done, and when. A representative embodiment in accordance with the present invention provides user access to new services such as data synchronization (DS) and device management (DM), and gives the user easy and direct access to services instantly. A representative embodiment of the present invention eliminates the difficulty of using a handset with a small keypad and screen to browse an Internet customer care portal. A representative embodiment of the present invention gives the user clear indication that what they are doing is exactly what they want. A representative embodiment of the present invention not only amends the many drawbacks of previous and currently existing methods, it also provides many value added services and co-exists with the previous and existing technology.

A representative embodiment of the present invention allows a service provider to provide general and flexible handset customer care portal services. It does not restrict the portal implementation in any way and the service provider may provide a very customized implementation. The network portal services may be well integrated with other services provided on the wireless network such as, for example, data synchronization, device management, SyncML, OMA download, and other wireless network over-the-air services.

In a representative embodiment of the present invention, the implementation at the mobile handset may reuse existing software, where software services such as, for example, DS/DM services, SyncML, OMA download, HTTP client, WAP, SMS, are provided. A representative embodiment of the present invention may leverage existing technologies and allow flexible implementation requirements for the mobile handset manufacturers.

Figure 3:
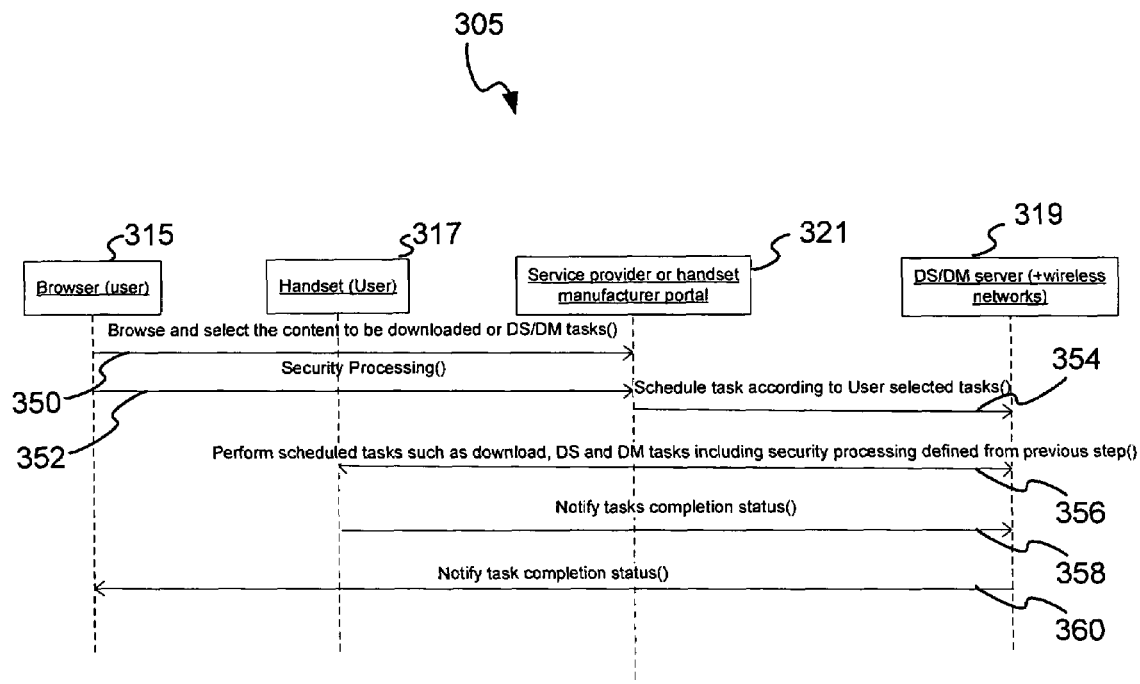
FIG. 3 is an interaction diagram for an exemplary management network that may correspond, for example, to the management network of FIG. 2, in accordance with a representative embodiment of the present invention.

FIG. 3 is an interaction diagram for an exemplary management network that may for example, correspond to the management network 205 of FIG. 2, in accordance with a representative embodiment of the present invention. The illustration of FIG. 3 shows the various actors and the information flow between the actors in the process of managing tasks for interaction with a mobile handset such as, for example, the mobile handset 219 of FIG. 2. The illustration of FIG. 3 depicts a flow wherein a user can set a schedule of downloads, schedule tasks such a device synchronization, etc. The management network comprises a browser 315 employed by a user such as those that execute on a PC or on a handset 317 including, for example, the Internet Explorer browser by Microsoft Corporation. The illustration of FIG. 3 also comprises a portal 321 such as, for example, those managed by a service provider or mobile handset manufacturer, and a data synchronization (DS)/device management (DM) server network 319 such as, for example, those that may be situated in an operator's network. The interactions comprise the user browsing the portal 321 from a mobile handset 317 or a PC (350). The user is authenticated before such user-selected tasks are scheduled (352), and then the user-selected tasks are scheduled to be executed by the DS/DM server 319 (354). The tasks involving the mobile handset 317 are then performed according to the user-selected schedule (356). Upon the completion of the scheduled tasks the mobile handset notifies the DS/DM server 319 (358), and a notification is communicated to the user from the DS/DM server 319 via the browser 315 (360).

The present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A device management network that facilitates user initiation of a device management task, the device management network comprising:

at least one mobile electronic device;

a web portal enabling selection of a device management task by a user using a web browser, wherein the device management task comprises at least one of a firmware update task, a software update task, a configuration update task, a user account setup task and a device provisioning task;

the web portal facilitating the user in the specification of a schedule for the device management task; and the device management network performing the device management task in accordance with the schedule.

2. The device management network of claim 1 further comprising:

at least one device management server capable of performing the device management task on the at least one mobile electronic device;

the at least one mobile electronic device capable of receiving a notification from the device management task;

the at least one mobile electronic device capable of executing at least a portion of the device management task; and the at least one mobile electronic device capable of notifying the at least one device management server after it has completed the at least a portion of the device management task.

3. The device management network of claim 1 wherein the at least one mobile electronic device is capable of facilitating browsing of the web portal and selection of the device management task.

4. The device management network of claim 1 wherein the at least one mobile electronic device comprises one of a cellular phone, a pager, a personal digital assistant (PDA), and a personal computer.

5. The device management network of claim 1 further comprising:

a communication device communicatively coupled to the web portal;

the communication device capable of browsing the web portal; and the web portal capable of accepting, via the communication device, user selections of device management tasks for managing the at least one mobile electronic device.

6. The device management network of claim 5 wherein the communication device comprises a personal computer (PC).

7. The device management network of claim 1 wherein the web portal authenticates the user before initiating execution of a device management task on the at least one mobile electronic device.

8. The device management network of claim 1 wherein a device management server authenticates the at least one mobile electronic device and the at least one mobile electronic device authenticates the device management server before executing a user-selected device management task.

* * * * *